United States Patent
Cutler et al.

(10) Patent No.: US 8,838,791 B2
(45) Date of Patent: Sep. 16, 2014

(54) TRANSIENT SUBSCRIPTION RECORDS

(75) Inventors: Kevin Cutler, Carp (CA); Xu Chen, Ottawa (CA); Kalyan Siddam, Nepean (CA)

(73) Assignee: Alcatel Lucent, Boulogne Billancourt (FR)

( * ) Notice: Subject to any disclaimer, the term of this patent is extended or adjusted under 35 U.S.C. 154(b) by 241 days.

(21) Appl. No.: 13/035,512

(22) Filed: Feb. 25, 2011

(65) Prior Publication Data

US 2012/0221723 A1 Aug. 30, 2012

(51) Int. Cl.
*G06F 15/173* (2006.01)

(52) U.S. Cl.
USPC .......................................... 709/225

(58) Field of Classification Search
USPC .................. 709/224, 220, 225, 203, 222, 226
See application file for complete search history.

(56) References Cited

U.S. PATENT DOCUMENTS

| | | | | |
|---|---|---|---|---|
| 6,571,287 B1 * | 5/2003 | Knight et al. | ................. | 709/225 |
| 2010/0180319 A1 | 7/2010 | Hu et al. | | |
| 2010/0191846 A1 * | 7/2010 | Raleigh | ........................ | 709/224 |

FOREIGN PATENT DOCUMENTS

| WO | 2010049002 A1 | 5/2010 |
|---|---|---|
| WO | 2011020498 A1 | 2/2011 |

OTHER PUBLICATIONS

Digital cellular telecommunications system; Universal Mobile Telecommunications Systems; LTE Policy and charging control architecture; 3GPP TS 23.303 Version 8.6.0 Release 8; Sophia-Antipolis, France; Jun. 2009.
European Extended Search report dated Apr. 11, 2014; for PCT/CA2012/050104.

* cited by examiner

*Primary Examiner* — Vivek Srivastava
*Assistant Examiner* — Normin Abedin
(74) *Attorney, Agent, or Firm* — Kramer Amado, P.C.

(57) ABSTRACT

Various exemplary embodiments relate to a method and related network node including one or more of the following: receiving, at the session management node, an initial request message, the initial request message including at least one subscription identifier; determining that the session management node does not have access to a subscription record associated with the at least one subscription identifier; generating a transient subscription record based on the initial request message; and processing the initial request message based on the initial request message and the transient subscription record.

19 Claims, 5 Drawing Sheets

| | 305 | 310 | 315 | 320 | 325 |
|---|---|---|---|---|---|
| | Session ID | Subscriber Name | Subscription IDs | QoS | ... |
| 330 | 0x042E | John Doe | a, b, c | 512/512 | ... |
| 340 | 0x3FA1 | Unknown | d, e | 32/64 | ... |
| 350 | ... | ... | ... | ... | ... |

400
| PCC Rule Creation | |
|---|---|
| Criteria | Result |
| {Subscriber Category = Gold; Subscriber Name != Unknown} | {QoS = 512/512} |
| {Subscriber Category = Silver; Subscriber Name != Unknown} | {QoS = 256/256} |
| {Subscriber Category = *; Subscriber Name = Unknown} | {QoS = 32/64} |
| ... | ... |
FIG. 4
500
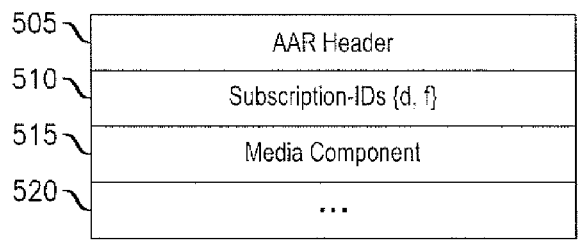
FIG. 5
600
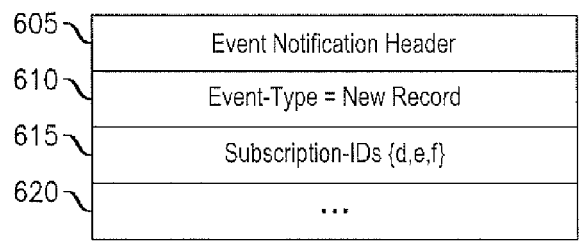
FIG. 6

TRANSIENT SUBSCRIPTION RECORDS

TECHNICAL FIELD

Various exemplary embodiments disclosed herein relate generally to subscription networks.

BACKGROUND

As the demand increases for varying types of applications within mobile telecommunications networks, service providers must constantly upgrade their systems in order to reliably provide this expanded functionality. What was once a system designed simply for voice communication has grown into an all-purpose network access point, providing access to a myriad of applications including text messaging, multimedia streaming, and general Internet access. In order to support such applications, providers have built new networks on top of their existing voice networks. As seen in second and third generation networks, voice services must be carried over dedicated voice channels and directed toward a circuit-switched core, while other service communications are transmitted according to the Internet Protocol (IP) and directed toward a different, packet-switched core. This led to unique problems regarding application provision, metering and charging, and quality of experience (QoE) assurance.

In an effort to simplify the dual core approach of the second and third generations, the 3rd Generation Partnership Project (3GPP) has recommended a new network scheme it terms "Long Term Evolution" (LTE). In an LTE network, all communications are carried over an IP channel from user equipment (UE) to an all-IP core called the Evolved Packet Core (EPC). The EPC then provides gateway access to other networks while ensuring an acceptable QoE and charging a subscriber for their particular network activity.

The 3GPP generally describes the components of the EPC and their interactions with each other in a number of technical specifications. Specifically, 3GPP TS 29.212, 3GPP TS 29.213, and 3GPP TS 29.214 describe the Policy and Charging Rules Function (PCRF), Policy and Charging Enforcement Function (PCEF), and Bearer Binding and Event Reporting Function (BBERF) of the EPC. These specifications also mention a Subscriber Profile Repository (SPR) that interacts with the PCEF through an Sp interface. These specifications further provide some guidance as to how these elements interact in order to provide reliable data services and charge subscribers for use thereof.

SUMMARY

Various embodiments relate to a method for providing network access by a session management node, the method including one or more of the following: receiving, at the session management node, an initial request message, the initial request message including at least one subscription identifier; determining that the session management node does not have access to a subscription record associated with the at least one subscription identifier; generating a transient subscription record based on the initial request message; and processing the initial request message based on the initial request message and the transient subscription record.

Various embodiments relate to system for providing network access to subscribers, the system including one or more of the following: an interface that receives an initial request message that includes at least one subscription identifier; a message handler that determines that a subscription record should be used to process the initial request message; a subscription record retriever that attempts to retrieve a subscription record associated with the at least one subscription identifier; and a transient subscription record generator that creates a transient subscription record based on the initial request message when the subscription record retriever cannot retrieve a subscription record associated with the at least one subscription identifier.

Various embodiments relate to machine-readable storage medium encoded with instructions for execution on a session management node for providing network access, the machine-readable storage medium including one or more of the following: instructions for receiving, at the session management node, an initial request message, the initial request message including at least one subscription identifier; instructions for determining that the session management node does not have access to a subscription record associated with the at least one subscription identifier; instructions for generating a transient subscription record based on the initial request message; and instructions for processing the initial request message based on the initial request message and the transient subscription record.

BRIEF DESCRIPTION OF THE DRAWINGS

In order to better understand various exemplary embodiments, reference is made to the accompanying drawings, wherein:

FIG. 4 illustrates an exemplary rule set for fulfilling subscriber requests;

FIG. 5 illustrates an exemplary subscriber request message;

FIG. 6 illustrates an exemplary event notification message;

DETAILED DESCRIPTION

Figure 1:
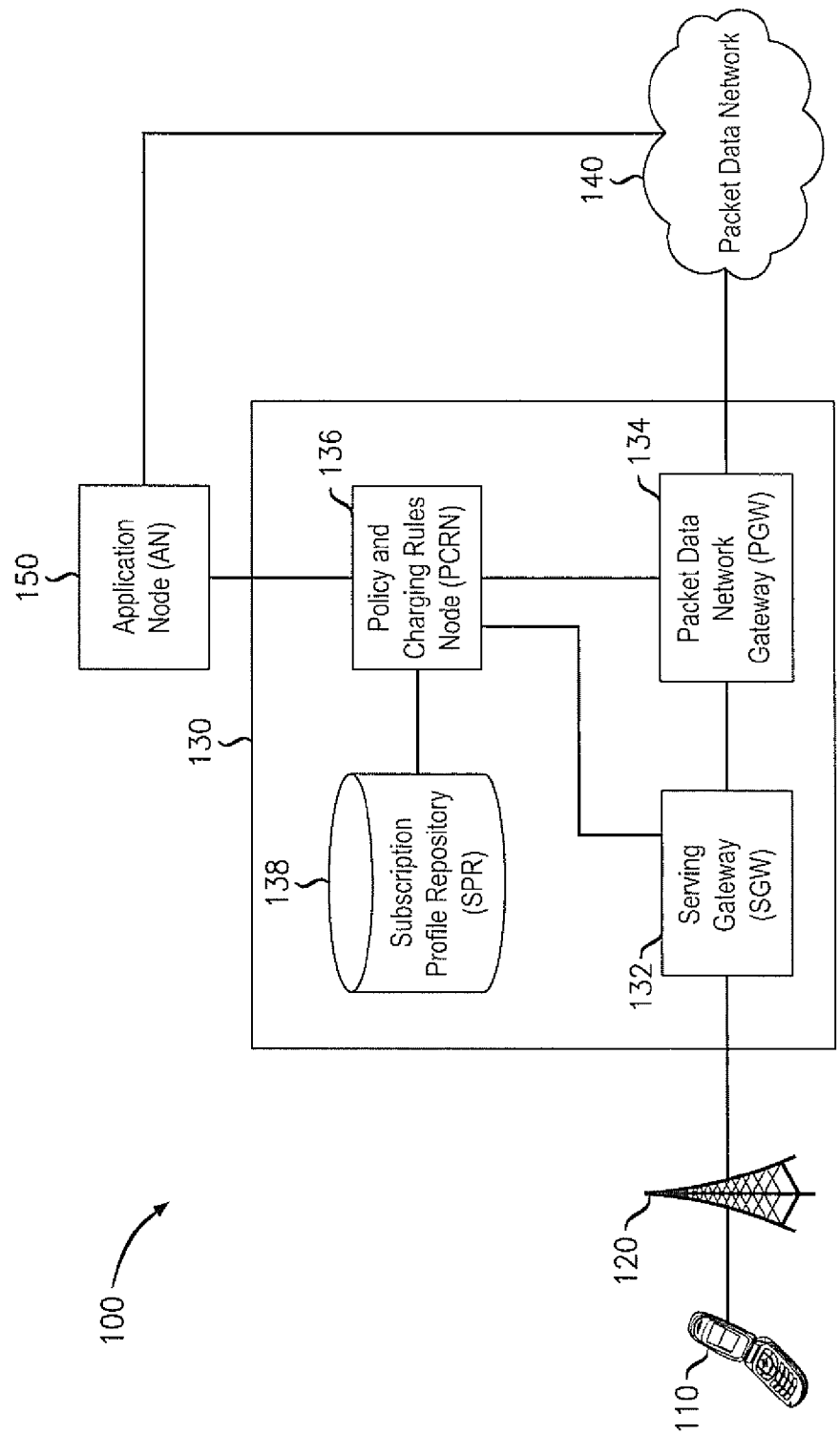
FIG. 1 illustrates an exemplary subscriber network for providing various data services.

While the 3GPP describes access to a Subscription Profile Repository (SPR), little guidance is provided in terms of specific implementation and error handling. In some cases, the Policy and Charging Rules Node (PCRN) may not have access to an appropriate subscription profile for use in processing a particular request. For example, communication with the SPR may be interrupted or the SPR may not yet have a subscription profile provisioned for the particular requesting user or device. The 3GPP technical specifications offer little guidance with regard to handling such error scenarios.

Previously implemented solutions simply drop or reject a request when an appropriate subscription record cannot be located. However, this solution is less than ideal, as many requests may be unfulfilled due to temporary error conditions. Accordingly, there is a need for a more robust method of handling a request when a matching subscription profile record cannot be found.

Many alternative networks, other than those implemented according to the LTE specifications, similarly provide network access based in part on the contents of a subscription profile or similar construct. The potential for similar errors regarding availability of such constructs exists in many such networks, whether wireless or wire line networks. Accordingly, there is an additional need for a method of handling such situations that is generally applicable to many such networks.

Referring now to the drawings, in which like numerals refer to like components or steps, there are disclosed broad aspects of various exemplary embodiments.

It should be noted that, while various examples relate to implementations of Long Term Evolution (LTE), as defined by the Third Generation Partnership Project (3GPP), the devices and methods presented herein may be applicable to other access systems or networks such as, for example, a network access system (NAS). Appropriate modifications will be apparent to those of ordinary skill in the art for implementing these devices and methods in conjunction with alternative access systems and/or networks.

FIG. 1 illustrates an exemplary subscriber network 100 for providing various data services. Exemplary subscriber network 100 may be a telecommunications network or other network for providing access to various services. Exemplary subscriber network 100 may include user equipment (UE) 110, base station 120, evolved packet core (EPC) 130, packet data network 140, and application node (AN) 150.

User equipment 110 may be a device that communicates with packet data network 140 for providing the end-user with a data service. Such data service may include, for example, voice communication, text messaging, multimedia streaming, and Internet access. More specifically, in various exemplary embodiments, user equipment 110 is a personal or laptop computer, wireless email device, cell phone, television set-top box, or any other device capable of communicating with other devices via EPC 130.

Base station 120 may be a device that enables communication between user equipment 110 and EPC 130. For example, base station 120 may be a base transceiver station such as an evolved nodeB (eNodeB) as defined by 3GPP standards. Thus, base station 120 may be a device that communicates with user equipment 110 via a first medium, such as radio communication, and communicates with EPC 130 via a second medium, such as Ethernet cable. Base station 120 may be in direct communication with EPC 130 or may communicate via a number of intermediate nodes (not shown). In various embodiments, multiple base stations (not shown) may be present to provide mobility to user equipment 110. Note that in various alternative embodiments, user equipment 110 may communicate directly with evolved packet core. In such embodiments, base station 120 may not be present.

Evolved packet core (EPC) 130 may be a device or network of devices that provides user equipment 110 with gateway access to packet data network 140. EPC 130 may further charge a subscriber for use of provided data services and ensure that particular quality of experience (QoE) standards are met. Thus, EPC 130 may be implemented, at least in part, according to the 3GPP TS 29.212, 29.213, and 29.214 standards. Accordingly, EPC 130 may include a serving gateway (SGW) 132, a packet data network gateway (POW) 134, a policy and charging rules node (PCRN) 136, and a subscription profile repository (SPR) 138.

Serving gateway (SGW) 132 may be a device that provides gateway access to the EPC 130. SGW 132 may be the first device within the EPC 130 that receives packets sent by user equipment 110 and may forward such packets toward PGW 134. SGW 132 may perform a number of additional functions such as, for example, managing mobility of user equipment 110 between multiple base stations (not shown) and enforcing particular quality of service (QoS) characteristics, such as guaranteed bit rate, for each flow being served. In various implementations, such as those implementing the Proxy Mobile IP (PMIP) standard, SGW 132 may include a Bearer Binding and Event Reporting Function (BBERF). In various exemplary embodiments, EPC 130 may include multiple SGWs (not shown) and each SGW may communicate with multiple base stations (not shown).

Packet data network gateway (PGW) 134 may be a device that provides gateway access to packet data network 140. PGW 134 may be the final device within the EPC 130 that receives packets sent by user equipment 110 toward packet data network 140 via SGW 132. PGW 134 may include a policy and charging enforcement function (PCEF) that enforces policy and charging control (PCC) rules for each service data flow (SDF). Thus, PGW 134 may be a policy and charging enforcement node (PCEN). PGW 134 may include a number of additional features such as, for example, packet filtering, deep packet inspection, and subscriber charging support.

Policy and charging rules node (PCRN) 136 may be a device that receives requests for services, generates PCC rules, and provides PCC rules to the PGW 134 and/or other PCENs (not shown). PCRN 136 may also establish other types of sessions at the request of UE 110 such as, for example, IP Connectivity Access Network (IP-CAN) sessions and/or gateway control sessions. PCRN 136 may receive requests from AN 150 via an RX interface, from SGW 132 via a Gxx interface, and/or from PGW 134 via a Gx interface. Upon receipt of a service request, PCRN 136 may generate or modify at least one PCC rule for fulfilling the service request. PCRN 136 may communicate with SPR 138 via the Sp interface when creating PCC rules. PCRN 136 may, for example, use SPR 138 to obtain subscriber service data and/or to coordinate messages from multiple sources.

Under various circumstances, PCRN 136 may not be able to obtain a subscription record from SPR 138. For example, SPR 138 may not store any record associated with a requested subscription identifier. In such cases, PCRN 136 may generate a transient subscription profile record based on the request. The request may then be fulfilled based on the transient record. Later, after an appropriate subscription record becomes available from SPR 138, PCRN 136 may transition from the transient record to the true subscription record, as will be described in fuller detail below.

Upon creation or modification of a PCC rule or upon request by the PGW 134, PCRN 136 may provide a PCC rule to PGW 134 via the Gx interface. In various embodiments, such as those implementing the PMIP standard for example, PCRN 136 may also generate QoS rules. Upon creation or modification of a QoS rule or upon request by the SGW 132, PCRN 136 may provide a QoS rule to SOW 132 via the Gxx interface.

Subscription profile repository (SPR) 138 may be a device that stores information related to subscribers to the subscriber network 100. Thus, SPR 138 may include a machine-readable storage medium such as read-only memory (ROM), random-access memory (RAM), magnetic disk storage media, optical storage media, flash-memory devices, and/or similar storage media. SPR 138 may be a component of PCRN 136, may constitute an independent node within EPC 130, or may be a combination of both. SPR 138 may also be distributed across a network, with some components within EPC 130 and other components connected via a network.

SPR 138 may store a subscription record for a number of subscribers. Each subscription record may include a number of subscription identifiers such as, for example, an IPv4 address, an IPv6 address, an international mobile subscriber identity (IMI), a network access identifier (NAI), a circuit identifier, a point-to-point protocol (PPP) identifier, and a mobile subscriber ISDN (MSISDN) number. Each subscription record may additionally include subscription parameters such as, for example, bandwidth limits, charging parameters, subscriber priority, and subscriber service preferences.

Note that in various alternative embodiments, subscriber network 100 may include a User Data Repository (UDR) (not shown) in lieu of SPR 138. Such a UDR may include similar data to that contained in the SPR 138. Various modifications to the techniques described herein will be apparent in order to provide interoperation between PCRN 136 and a UDR.

Packet data network 140 may be any network for providing data communications between user equipment 110 and other devices connected to packet data network 140, such as AN 150. Packet data network 140 may further provide, for example, phone and/or Internet service to various user devices in communication with packet data network 140.

Application node (AN) 150 may be a device that includes an application function (AF) and provides an application service to user equipment 110. Thus, AN 150 may be a server or other device that provides, for example, a video streaming or voice communication service to user equipment 110. When AN 150 is to begin providing application service to user equipment 110, AN 150 may generate a request message, such as an AA-Request (AAR) according to the Diameter protocol, to notify the PCRN 136. This request message may include information such as an identification of the subscriber using the application service and an identification of the particular service data flows that must be established in order to provide the requested service. AN 150 may communicate such an application request to the PCRN 136 via the Rx interface.

Various services may be requested, and subsequently established, based on an AAR sent to PCRN 136 by AN 150, based on a CCR sent to the PCRN 136 by PGW 134 or SGW 132, or based on a combination thereof. For example, PCRN 136 may receive an AAR and a CCR both requesting a particular service for a particular user. Accordingly, the PCRN 136 is adapted to determine that two request messages are associated with the same session and process the messages accordingly. For example, the PCRN 136 or a Diameter Proxy Agent (not shown) may use a session binding identifier (SBI) to determine that a request message is related to a previously received request message. Thus, PCRN 136 may establish a session based on an initial request message and subsequently modify the session based on the supplemental request message.

Having described the components of subscriber network 100, a brief summary of the operation of subscriber network 100 will be provided. It should be apparent that the following description is intended to provide an overview of the operation of subscriber network 100 and is therefore a simplification in some respects. The detailed operation of subscriber network 100 will be described in further detail below in connection with FIGS. 2-9.

PCRN 136 may receive a CCR or AAR requesting the establishment of a session. For example, the CCR or ARR may request the establishment of a new IP-CAN session or a new application session. The request message may specify at least one subscription identifier associated with the user equipment 110. In fulfilling the request, PCRN 136 may first attempt to retrieve, from SPR 138, a subscription profile associated with the provided subscription identifiers. However, PCRN 136 may receive an error indicating that such a record cannot be found. For example, SPR 138 may be unavailable or SPR 138 may not have a matching record for at least one of the subscription identifiers.

PCRN 136 may proceed by generating a transient subscription record. The subscription record may include information gleaned from the request message such as, for example, the provided subscription identifiers. PCRN 136 may further include a subscriber name of "unknown" within the transient subscription record. PCRN 136 may then fulfill the request using the transient subscription record. PCRN 136 may use various default parameters and/or processing rules specifically defined for transient subscription records.

Subsequently, PCRN 136 may determine that a true subscription record is now available for the subscription identifiers. For example, PCRN 136 may successfully retrieve a subscription record in response to receiving a supplemental request or may receive a notification indicating that a new record has been provisioned in the SPR 138.

Regardless of the method of determination, PCRN 136 may proceed to replace the transient subscription record with the true subscription record. PCRN 136 may also proceed to modify any sessions established for the subscriber based on the now-available subscription record. For example, the PCRN 136 may generate a new PCC rule including new QoS and/or charging parameters determined based on the true subscription profile.

Figures 2, 3:
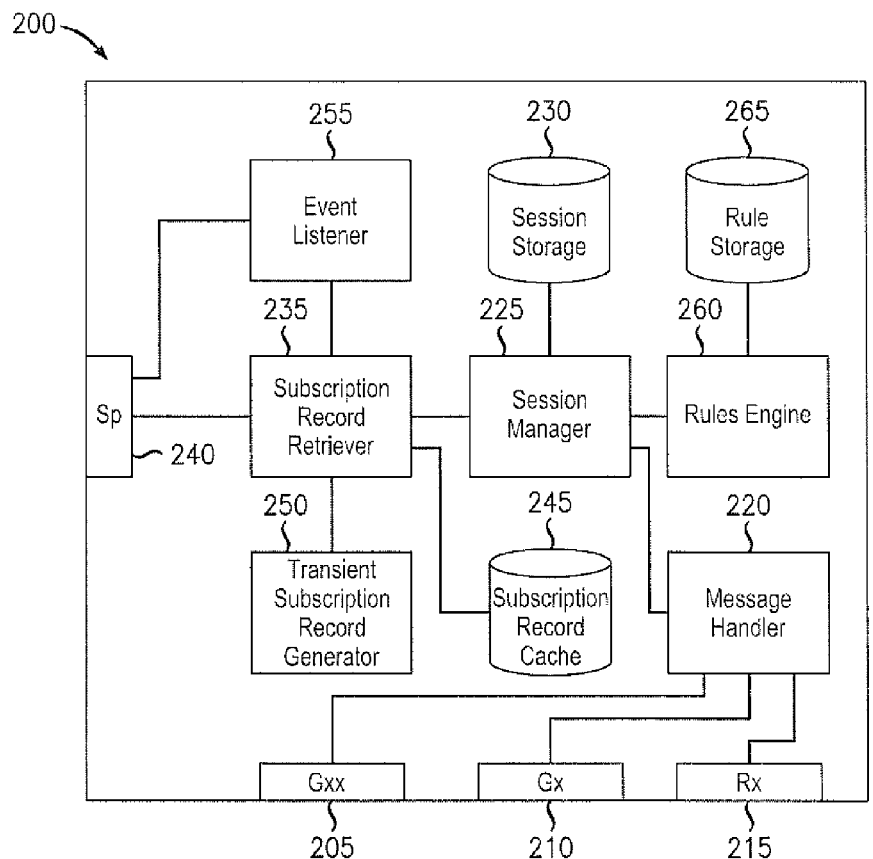
FIG. 2 illustrates an exemplary session management node for fulfilling subscriber requests.
FIG. 3 illustrates an exemplary data arrangement for storing session data.

FIG. 2 illustrates an exemplary session management node 200 for fulfilling subscriber requests. In various embodiments implementing the LTE standard, session management node 200 may be a PCRN such as PCRN 136. Exemplary session management node 200 may include a Gxx interface 205, a Gx interface 210, an Rx interface 215, a message handler 220, a session manager 225, a session storage 230, a subscription record retriever 235, an Sp interface 240, a subscription record cache 245, a transient subscription record generator 250, an event listener 255, a rules engine 260, and a rules storage 265. It will be apparent that various components may be specific to implementations of particular standards and that various modifications may be appropriate for implementation of alternative standards.

Gxx interface 205 may be an interface comprising hardware and/or executable instructions encoded on a machine-readable storage medium configured to communicate with other network nodes such as, for example, SGW 132 using the Diameter protocol. Accordingly, Gxx interface 205 may be adapted to transmit RAR and CCA messages and to receive RAA and CCR messages.

Gx interface 210 may be an interface comprising hardware and/or executable instructions encoded on a machine-readable storage medium configured to communicate with other network nodes such as, for example, PGW 134 using the Diameter protocol. Accordingly, Gx interface 210 may be adapted to transmit RAR and CCA messages and to receive RAA and CCR messages.

Rx interface 215 may be an interface comprising hardware and/or executable instructions encoded on a machine-readable storage medium configured to communicate with other network nodes such as, for example, AN 150 using the Diameter protocol. Accordingly, Rx interface 215 may be adapted to transmit RAR and AAA messages and to receive RAA and AAR messages.

Message handler 220 may include hardware and/or executable instructions on a machine-readable storage medium configured to receive and transmit various messages via the Gxx interface 205, Gx interface 210, and Rx interface 215. For example, message handler 220 may receive an AAR or CCR, determine that the packet requests the establishment of a new session, and forward the message to the session manager 225 for further processing. As a further example, message handler 220 may receive an RAR or CCA from the session manager 225 for establishment, modification, or termination of a session and transmit the message over the appropriate interface 205, 210, 215.

Session manager 225 may include hardware and/or executable instructions on a machine-readable storage medium configured to process requests related to various sessions. For example, session manager 225 may receive a request for a new session via message handler 220, generate a new PCC rule, and push the new PCC rule to the appropriate node, such as PGW 134. When generating a new PCC rule or otherwise processing a request, session manager 225 may utilize a subscription record, retrieved by subscription record retriever 235, and results of a rules engine 260 applying appropriate rules, as will be described in greater detail below.

Session storage 230 may be any machine-readable medium capable of storing data related to established sessions. Accordingly, session storage 230 may include a machine-readable storage medium such as read-only memory (ROM), random-access memory (RAM), magnetic disk storage media, optical storage media, flash-memory devices, and/or similar storage media.

Subscription record retriever 235 may include hardware and/or executable instructions on a machine-readable storage medium configured to retrieve a subscription record to be used by session manager 225 in processing a request. Accordingly, subscription record retriever 235 may receive one or more subscription identifiers extracted by the session manager 225 from the request message. Alternatively, subscription record retriever 235 may receive the request message from session manager 225 and subsequently extract the associated subscription identifiers itself. Once the subscription record retriever 235 has access to the subscription identifiers, subscription record retriever may generate and transmit a query message to an SPR, such as SPR 138, via Sp interface 240.

Subscription record retriever 235 may receive a subscription record via Sp interface 240 in response to a transmitted query. In such a case, subscription record retriever 235 may simply pass the retrieved subscription record to session manager 225 for further processing. Subscription record retriever 235 may alternatively receive an error message via Sp interface 240 in response to a transmitted query. Subscription record retriever 235 may then request a new transient subscription record from transient subscription record generator 250 and forward the resulting transient subscription record to session manager 225. Alternatively, subscription record retriever 235 may take different action based on the content of the error message. For example, subscription record retriever 235 may request a transient subscription record if the error message indicates that no record was found whereas subscription record retriever 235 may simply forward the error to the session manager 225 if the error message indicates another type of error.

In various embodiments, subscription record retriever 235 may utilize a subscription record cache 245. For example, in various embodiments, subscription record cache 245 may include a cache of subscription records previously retrieved via Sp interface 240. In such embodiments, subscription record retriever 235 may first search this cache for the appropriate subscription record, prior to generating and transmitting a request message. Subscription record retriever 235 may further update subscription record cache 245 upon retrieving a new subscription record via the Sp interface 240.

As another example, subscription record cache 245 may alternatively or additionally include a transient record cache. Such a cache may store copies of each transient record created by transient subscription record generator 250. Alternatively, such a cache may only store subscription identifiers associated with previously created transient records. Such a cache may be useful, for example, when transitioning to a true subscription record. For example, when subscription record retriever 235 retrieves a subscription profile, subscription record retriever 235 may search such a cache to determine that a transient record was previously generated for the associated subscription identifiers. Subscription record retriever 235 may then be operable to indicate to session manager 225 that at least one session should be transitioned to the newly-available subscription record.

Sp interface 240 may be an interface comprising hardware and/or executable instructions encoded on a machine-readable storage medium configured to communicate with other network nodes such as, for example, SPR 138 using the Diameter protocol. Accordingly, Sp interface 240 may be adapted to transmit requests for subscription records and to receive subscription records, error messages, and event messages.

In various embodiments wherein a User Data Repository is provided, session management node 200 may include a Ud interface (not shown) in lieu of Sp interface 240. Various modifications will be apparent for utilizing Ud interface to retrieve subscription data in conjunction with the methods described herein.

Subscription record cache 245 may be any machine-readable medium capable of storing data related to previously-retrieved subscription records and/or previously-generated transient records. Accordingly, subscription record cache 245 may include a machine-readable storage medium such as read-only memory (ROM), random-access memory (RAM), magnetic disk storage media, optical storage media, flash-memory devices, and/or similar storage media. In various embodiments, subscription record cache 245 may be stored together with session storage 230 within memory or may be stored in a separate component.

Transient subscription record generator 250 may include hardware and/or executable instructions on a machine-readable storage medium configured to create a transient subscription record at the request of subscription record retriever 235. Transient subscription record generator 250 may first receive a number of subscription identifiers and/or the request message. Transient subscription record generator 235 may then proceed to generate a new transient record using the provided data. For example, the new transient record may include each of the provided subscription identifiers. The new transient subscription record may also include a name of "unknown" and/or some other indication that the transient record is not a true subscription record.

Transient subscription record generator may further update previously created transient records based on newly available information. For example, if the session management node receives a supplemental request message for a previously provisioned service, the transient subscription record generator may update the previously-created transient ent record based on the supplemental request message. The supplemental request message may, for example, include additional subscription identifiers, which the transient subscription record generator 250 may then add to the previously-created transient record.

In various alternative embodiments, transient subscription record generator 250 may utilize rules engine 260 to populate a transient subscription record with data. For example, rules engine may define default QoS characteristics to be included in a transient record.

Event listener 255 may include hardware and/or executable instructions on a machine-readable storage medium configured to receive and process events. For example, event listener 255 may receive an event message via Sp interface 240 indicating that an SPR has added, deleted, or modified a subscription record. Event listener 255 may be adapted to handle each scenario. For example, if the event indicates that a new record has been provisioned, event listener 255 may notify subscription record retriever 235. In various embodiments, such an event message may further carry a number of subscription identifiers associated with the new subscription record. In such embodiments, event listener 255 may further extract these subscription identifiers and send them to subscription record retriever 235. As previously explained, subscription record retriever 235 may be adapted to determine whether a newly-available, subscription record should replace a previously-created transient record.

Rules engine 260 may include hardware and/or executable instructions on a machine-readable storage medium configured to receive requests for rule results and apply an appropriate rule based on context data. For example, when establishing a new session, session manager 225 may request a rule result from rules engine 260 to determine the QoS characteristics to be used for the new session. Using context information provided by session manager 225 or otherwise available to rules engine 260, rules engine 260 may iterate through a number of rules stored in rules storage 265. Once the rules engine 260 locates a rule that is applicable to the available context data, rules engine may return the result of the rule (e.g., the appropriate QoS characteristics) to session manager 225. In various embodiments, rules engine 260 may be adapted to use a true subscription record and/or a transient subscription record as context data. Rules engine 260 may further be able to discriminate between true and transient records and to use this information as context data. Thus, different rules may be applied for transient records than those applied for true subscription records.

Rules storage 265 may be any machine-readable medium capable of storing rules used by rules engine 260. Accordingly, rules storage 265 may include a machine-readable storage medium such as read-only memory (ROM), random-access memory (RAM), magnetic disk storage media, optical storage media, flash-memory devices, and/or similar storage media. In various embodiments, subscription rules storage 265 may be stored together with session storage 230 and/or subscription record cache 245 within memory or may be stored in a separate component. In various alternative embodiments, rules storage 265 may be stored within a different node than session management node 200 and may be remotely accessible by rules engine 260. As yet another alternative, rules engine 260 and rules engine 265 may both be located elsewhere and remotely accessible by session manager 225.

FIG. 3 illustrates an exemplary data arrangement 300 for storing session data. Data arrangement 300 may be a table in a database or cache such as session storage 230. Alternatively, data arrangement 300 may be a series of linked lists, an array, or a similar data structure. Thus, it should be apparent that data arrangement 300 is an abstraction of the underlying data; any data structure suitable for storage of this data may be used.

Data arrangement 300 may include numerous fields such as, for example, session ID field 305, subscriber name field 310, subscription IDs field 315, QoS field 320. Data arrangement 300 may include numerous additional fields 325.

Session ID field 305 may store a unique identifier for each session being managed. Subscriber name 310 may store the name of a subscriber associated with the session. Subscription IDs field 315 may store subscription identifiers associated with the subscriber to which the session belongs. QoS field 320 may store various QoS characteristics for a particular session such as, for example, a maximum bitrate, aggregate maximum bitrate, and/or a guaranteed bitrate. Accordingly, it should be apparent that the data illustrated in QoS field 320 (and any other field) may be a simplification. Such QoS data may be simply read from a subscription record, a request message, and/or determined by rules engine. A number of fields may store data extracted from or otherwise associated with a subscription profile. For example, subscriber name field 310, subscription IDs field 315, and/or QoS field 320 may store data that is also stored elsewhere in a subscription record.

Data arrangement 300 may include a number of session records. Session record 330, for example, is associated with task "0x042E" for a subscriber named "John Doe." John Doe may be identified by subscription identifiers a, b, and c. Further, session 0x042E is provided with a QoS of 512 kbps in both directions. It should be apparent that, as session record 330 stores the real name of an associated subscriber, session record 330 was created using a true subscription record.

In contrast, session record 340 indicates that session "0x3FA1" is associated with an "Unknown" subscriber, and was therefore generated based on a transient subscription record. The unknown subscriber carries subscription identifiers d and e. Further, session 0x3FA1 is given a QoS of 32 kbps upstream and 64 kbps downstream. It should be apparent that various alternative methods may be utilized for differentiating between true and transient records. Data arrangement 300 may include numerous additional records 350.

FIG. 4 illustrates an exemplary rule set 400 for fulfilling subscriber requests. Rule set 400 may be a table in a database or cache such as rule storage 265. Alternatively, rule set 400 may be a series of linked lists, an array, or a similar data structure. Thus, it should be apparent that rule set 400 is an abstraction of the underlying data; any data structure suitable for storage of this data may be used.

Rule set 400 may define a rule set useful in PCC rule creation. Rule storage 265 may store numerous additional rule sets applicable to various other actions and session types such as, for example, IP-CAN session establishment.

Rule set 400 may include a criteria field 405 that defines various conditions to determine whether each rule is applicable to a particular context. Rule set 400 may further include a result field 410 that defines the result that should be returned for each rule, when applicable.

As an example, rule 425 indicates that when QoS is requested, subscriber category is Gold, and the subscriber name is not unknown, the rules engine should return a QoS of 512 kbps in both directions. As a further example, rule 430 indicates that when QoS is requested, subscriber category is Silver, and the subscriber name is not unknown, the rules engine should return a QoS of 256 kbps in both directions.

As a further example, rule 435 indicates that when the subscriber name is unknown, the QoS should be 32 kbps up and 64 kbps down, regardless of subscriber category. Thus, according to rule set 400, requests will be established with lower bandwidth when a true subscription record is unavailable. It should be apparent that various other configurations may be used. For example, when a transient subscription record must be used, the request may simply be denied. Rule set 400 may include numerous additional rules 440.

FIG. 5 illustrates an exemplary subscriber request message 500. Exemplary request message 500 is an AAR message. However, it should be apparent that a request message may alternatively be a CCR. Various differences between the two formats will be apparent to those of skill in the art. Request message 500 may further be either an initial request message or a supplemental request message, supplementary to a previously received CCR.

Request message 500 may include an AAR header 505, as defined by the Diameter protocol. Request message may further include an attribute-value pair (AVP) that indicates one or more subscription identifiers associated with the request. Such subscription identifiers may be used to locate a corresponding subscription record and/or create or update a transient subscription record.

Request message 500 may further include one or more media component AVPs 515 indicating the type of session being requested. Request message 500 may include numerous additional AVPs 520.

FIG. 6 illustrates an exemplary event notification message 600. Event notification message 600 may be, for example, a notification transmitted by an SPR to indicate a change to its database. Event notification message 600 may include a header 605 and an event type AVP 610 to indicate what type of event is being reported. As an example, event type AVP 610 indicates that a new record has been provisioned at an SPR. Event notification message 600 may also include a subscription IDs AVP to indicate the subscription identifiers associated with the new subscription record. Event notification message may include numerous additional AVPs 620. Event notification message may be used, among other things, to determine when new subscription records are available that may be used to replace previously created transient records, as will be discussed in greater detail below.

Figure 7:
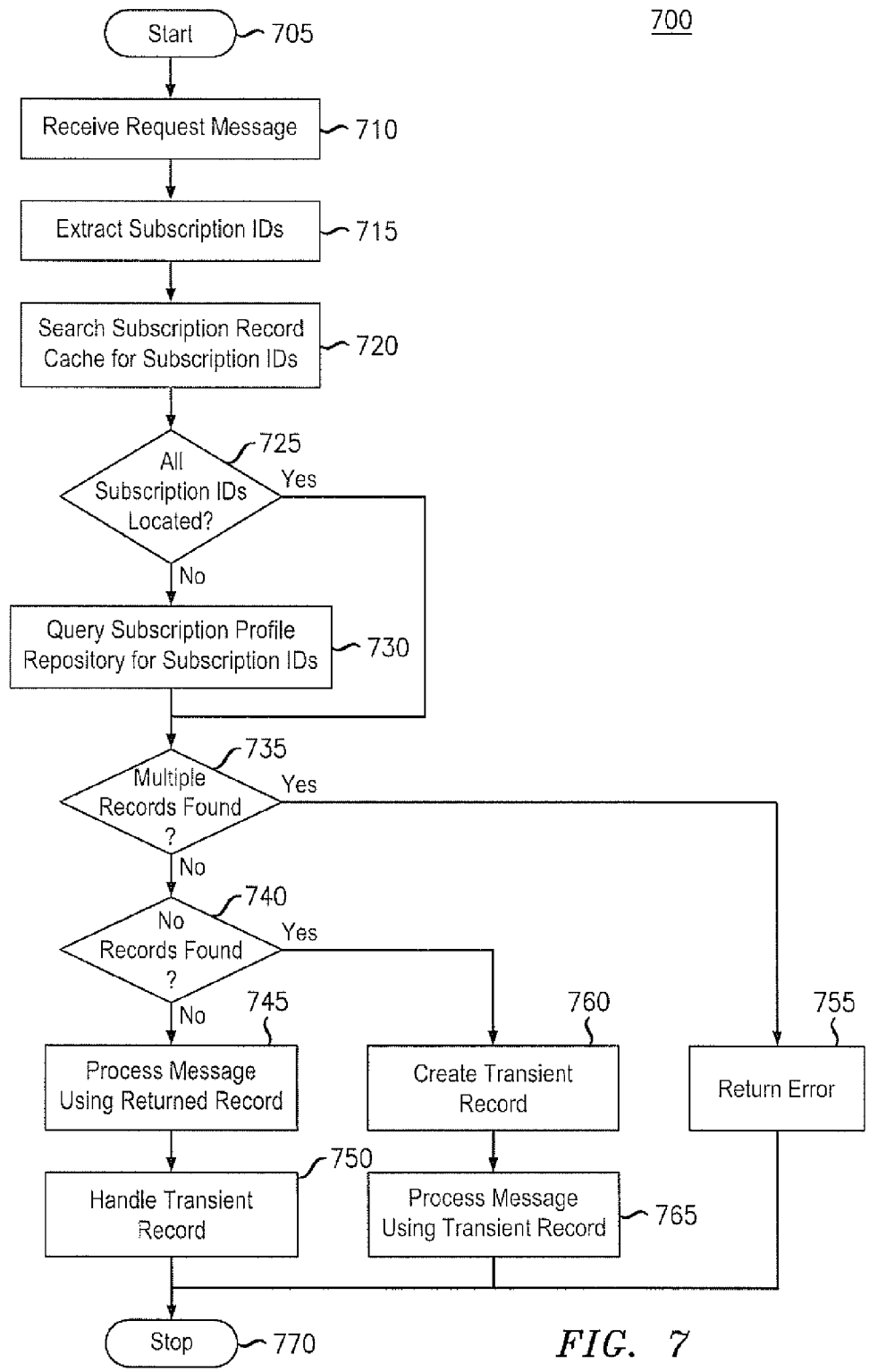
FIG. 7 illustrates an exemplary method for fulfilling a subscriber request based on a subscription profile.

FIG. 7 illustrates an exemplary method 700 for fulfilling a subscriber request based on a subscription profile. Method 700 may be performed, for example, by the components of session management node 200 such as message handler 220, session manager 225, subscription record retriever 235, and transient subscription record generator 250.

Method 700 may begin in step 705 and proceed to step 710, where session management node 200 receives a request message from another node. Such a request message may be an initial request message or a supplemental request message. Method 700 may then proceed to step 715, where session management node 200 extracts any subscription identifiers included in the request message. Session management node 200 may then attempt to locate a corresponding subscription record by first searching a local subscription record cache in 720. Session management node 200 may then determine if all subscription identifiers were located in the cache in step 725. If all subscription identifiers were located, then no further searching must be done and method 700 may proceed to step 735. Otherwise, session management node 200 may continue searching for the remaining subscription identifiers by constructing and transmitting a query to an SPR in step 730.

In various alternative embodiments, session management node 200 may not maintain a subscription record cache. In such embodiments, method 700 may proceed directly from step 715 to step 735. Alternatively, session management node 200 may store all subscription records in a local cache and may not have access to an SPR at all. In this case, method 700 may proceed directly from step 720 to step 735.

Session management node 200 may analyze the search results by first determining whether multiple records have been located that correspond to the subscription identifiers in step 735. Such a result may indicate that the subscription identifiers included in the request message were not consistent with each other. If this is the case, method 700 may proceed to step 755 where session management node 200 may handle the error as known to those of skill in the art. For example, session management node 200 may reject the request. Method 700 may then end in step 770. Alternatively, session management node 200 may attempt to establish a transient subscription record for this case by instead proceeding to step 760.

If multiple records were not returned, method 700 may instead proceed from step 735 to step 740, where session management node 200 may determine whether no records were located for any subscription identifier. If no records were located, session management node 200 may generate a new transient subscription record in step 760 and subsequently process the request using the new transient record in step 765. In various exemplary embodiments, prior to creating a new transient record, session management node 200 may determine whether a transient subscription record has previously been created for any of the subscription identifiers. If so, session management node 200 may update the previously-created transient record based on the most recent request message in step 760 instead of creating a new transient record. Method 700 may then end in step 770.

If, however, a single record was found for the provided subscription identifiers, method 700 may instead-proceed from step 740 to step 745, where session management node 200 may process the request using the true subscription record. Session management node 200 may also handle any previously created transient record in step 750. Method 700 may then end in step 770.

Figure 8:
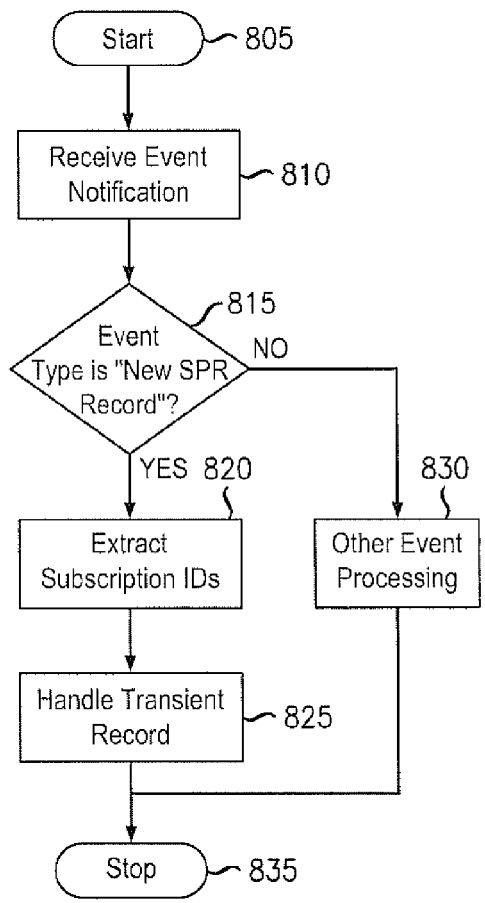
FIG. 8 illustrates an exemplary method for processing an event notification message.

FIG. 8 illustrates an exemplary method 800 for processing an event notification message. Method 800 may be performed, for example, by the components of session management node 200 such as event listener 255.

Method 800 may begin in step 805 and proceed to step 810 where session management node 200 may receive an event notification message from another node. Session management node 200 may then begin to determine what type of event is associated with the received event notification in step 815 by determining whether the event type indicates the provisioning of a new subscription record at the SPR. If the event notification is not a notification of a new subscription record, session management node 200 may perform additional processing of the notification in step 830. Appropriate additional processing will be apparent to those of skill in the art.

If, on the other hand, the event notification does indicate that a new subscription record has been provisioned, method 800 may proceed from step 815 to step 820. In step 820, session management node 200 may extract a number of subscription identifiers from the notification. Next, in step 825, session management node 200 may handle any previously created transient record associated with the subscription identifiers. Method 800 may then end in step 825.

Figure 9:
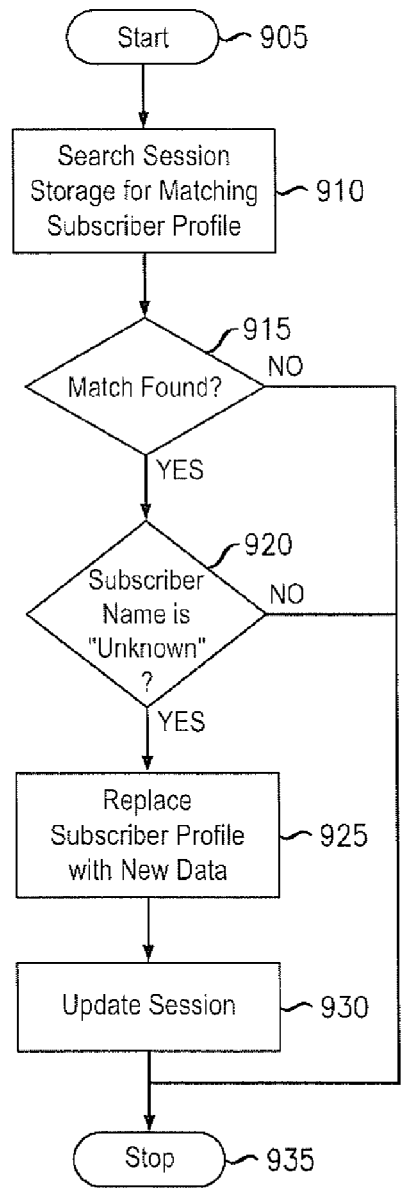
FIG. 9 illustrates an exemplary message for transition based on the provision a subscription profile.

FIG. 9 illustrates an exemplary method 900 for transition based on the provision a subscription profile. Method 900 may be performed, for example, by the components of session management node 200 such as session manager 225 and/or subscription record retriever 235. Method 900 may indicate the steps taken to handle any transient records associated with a true subscription record. Thus, method 900 may correspond to step 750 of method 700 and/or step 825 of method 800.

Method 900 may begin in step 905 and proceeds to step 910 where session management node 200 may search through session storage 230 for any sessions including provided subscription identifiers. Alternatively or additionally, session management node 200 may search a transient record cache, if present, to determine whether any matching transient records exist. In step 915, session management node 200 may determine whether a matching session was found for the subscription identifiers. If no session was found, method 900 may end in step 935.

On the other hand, if a matching session was found, session management node 200 may determine whether the matching session was established based on a transient record. For example, session management node 200 may determine whether the subscriber name for the session is "unknown." If the session was not created based on a transient record, method 900 may simply end in step 935.

If the session was created based on a transient record, however, method may proceed from step 920 to step 925, where session management node 200 may update the session record to include the data contained in the now-available true subscription record. For example, session management node 200 may replace the unknown name with the true name for the subscriber. Session management node 200 may then update the affected sessions. For example, session management node 200 may invoke the rules engine to determine if any other information for the session should be changed. Session management node 200 may also generate messages to transmit to the SGW, PGW, or another node to notify such nodes of the updated session information. Method 900 may then end in step 930.

Having described exemplary components and methods for the operation of exemplary subscriber network 100 and session management node 200, an example of the operation of exemplary subscriber network 100 and session management node 200 will now be provided with reference to FIGS. 1-9. Session management node 200 may correspond to PCRN 136; data arrangement 300 may indicate the contents of session storage 230; and rule set 400 may indicate the contents of rule storage 265.

As shown in session record 340, a session was previously created and is currently managed by session management node 200 based on a transient subscription record. The transient subscription record was created based on a request including subscription identifiers d and e.

Session management node then receives request message 500. Session manager 225 identifies request message as a supplementary request message associated with session record 340. Session manager 225 requests a subscription record associated with subscription identifiers d and f from subscription record retriever 235. Subscription record retriever then checks subscription record cache 245 at step 720 and queries SPR 138 at step 730 for any records associated with the specified subscription identifiers. If a single true subscription record were returned, session management node 200 would update session record 340 in light of the new subscription record. However, at this time, no subscription record is available. Accordingly, at step 760, session manager updates session record 340 to include the additional subscription identifier "f," as indicated by the request message 500. Session manager 225 also performs any other updates to the session in light of the supplemental request message 500 in step 765, as known to those of skill in the art.

Later, event listener 255 receives event notification 600 from SPR 138. Event listener 255 determines that the event is a new record event in step 815 and extracts subscription identifiers d, e, and f from subscription identifier AVP 615 in step 820. Next, in step 910, session manager locates session record 340. Since session record 340 was created based on a transient subscription record, as indicated by the "unknown" subscriber name, session manager 225 updates session record 340 to include the data of the true subscription record in step 925. Thus, "unknown" is replaced with "John Cardholder" in the subscriber name field 310. Next, in step 930, rules engine 260 determines that, because John Cardholder's subscription record indicates a subscriber category of "Silver," rule 430 is applicable to session 0x3FA1. Accordingly, session manager 255 changes the QoS field 320 for session record 340 to 256 kbps in both directions. Finally, session manager 255 constructs a RAR message including the new QoS information and pushes the RAR to PGW 134 for installation and enforcement.

According to the foregoing, various exemplary embodiments provide for robust handling of errors encountered when retrieving subscription records. In particular, by generating a transient subscription record, a request for a session may be fulfilled when no true subscription record is available. Further, the transient record may be replaced at a later time when a true subscription record is available, thereby facilitating transitioning of sessions.

It should be apparent from the foregoing description that various exemplary embodiments of the invention may be implemented in hardware and/or firmware. Furthermore, various exemplary embodiments may be implemented as instructions stored on a machine-readable storage medium, which may be read and executed by at least one processor to perform the operations described in detail herein. A machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be effected while remaining within the spirit and scope of the invention. Accordingly, the foregoing disclosure, description, and figures are for illustrative purposes only and do not in any way limit the invention, which is defined only by the claims.

What is claimed is:

1. A method for providing network access by a session management node, the method comprising:
receiving, at the session management node, an initial request message, the initial request message including at least one subscription identifier;
determining that the session management node does not have access to a subscription record associated with the at least one subscription identifier;
generating a transient subscription record based on the initial request message; and
establishing a session based on the initial request message and the transient subscription record, wherein establishing a session includes identifying at least one Policy Charging and Control (PCC) rule associated with the transient subscription record;

subsequent to generating the transient subscription record based on the initial request message:
receiving an indication that the session management node has access to a subscription record associated with the at least one subscription identifier;
replacing the transient subscription record with the subscription record associated with the at least one subscription identifier; and
subsequent to receiving an indication that the session management node has access to a subscription record associated with the at least one subscription identifier, initiating a change to at least one previously established session based on the subscription record associated with the at least one subscription identifier.

2. The method of claim 1, wherein the step of determining that the session management node does not have access to a subscription record associated with the at least one subscription identifier comprises determining that the session management node does not have access to a subscription record associated with any subscription identifier of the at least one subscription identifier.

3. The method of claim 1, wherein establishing a session based on the initial request message and the transient subscription record comprises: establishing the session based on the at least one PCC rule associated with the transient subscription record.

4. The method of claim 1, wherein the step of receiving an indication that the session management node has access to a subscription record associated with the at least one subscription identifier comprises: receiving, at the session management node, a supplemental request message associated with the initial request message; and retrieving, in response to receiving the supplemental request message, a subscription record associated with the at least one subscription identifier.

5. The method of claim 1, wherein the step of receiving an indication that the session management node has access to a subscription record associated with the at least one subscription identifier comprises: receiving an event message from another node of the network; determining that the event message indicates that the session management node now has access to an additional subscription record; and determining that the at least one subscription identifier is associated with the additional subscription record.

6. The method of claim 1, wherein updating the session based on the subscription record comprises: identifying at least one PCC rule associated with the subscription record; and updating the session based on the at least one PCC rule associated with the subscription record.

7. The method of claim 1, further comprising, subsequent to generating the transient subscription record based on the initial request message: receiving, at the session management node, a supplemental request message associated with the initial request message; and updating the transient subscription record based on the supplemental request message.

8. The method of claim 1, further comprising: including, in the transient subscription record, an indication that the transient subscription record is associated with an unknown user; retrieving at least one rule for use in processing the initial request message; and determining whether the at least one rule should be applied based on the indication that the transient subscription record is associated with an unknown user.

9. A system for providing network access to subscribers, the system comprising:
a processor, wherein the processor further comprises:
an interface that receives an initial request message that includes at least one subscription identifier;
a message handler that determines that a subscription record should be used to process the initial request message;
a subscription record retriever that attempts to retrieve a subscription record associated with the at least one subscription identifier;
a transient subscription record generator that creates a transient subscription record based on the initial request message when the subscription record retriever cannot retrieve a subscription record associated with the at least one subscription identifier; and
an event listener that:
receives an event message from another device;
determines whether the event message indicates that a new subscription record has been provisioned;
if the event message indicates that a new subscription record has been provisioned, determines whether the new subscription record is associated with the transient subscriber record; and
if the new subscription record is associated with the transient subscriber record, indicates that the transient subscriber record should be replaced.

10. The system of claim 9 further comprising a second interface that receives a supplementary request message, wherein: the message handler further determines that the supplementary request message is associated with the initial request message; and the subscription record retriever further attempts to retrieve a subscription record associated with the at least one subscription identifier subsequent to the second interface receiving the supplementary request message.

11. The system of claim 10, wherein the transient subscription record generator further updates the transient subscription record when the subscription record retriever cannot retrieve a subscription record associated with the at least one subscription identifier subsequent to the second interface receiving the supplementary request message.

12. The system of claim 10, further comprising: a memory that stores subscription data; and a session manager that: stores the transient subscription record in the memory that stores subscription data when the subscription record retriever cannot retrieve a subscription record associated with the at least one subscription identifier, and replaces the transient subscription record in the memory that stores subscription data with the subscription record associated with the at least one subscription identifier when the subscription record retriever retrieves a subscription record associated with the at least one subscription identifier subsequent to the second interface receiving the supplementary request message.

13. The system of claim 9, further comprising a subscription record cache that stores a plurality of subscription records, wherein: when the subscription record retriever attempts to retrieve a subscription record associated with the at least one subscription identifier, the subscription record retriever searches the subscription record cache for a subscription record associated with the at least one subscription identifier, and when the transient subscription record generator that creates a transient subscription record based on the initial request message, the subscription record retriever adds the transient subscription record to the subscription record cache.

14. The system of claim 9, further comprising an unknown cache that stores a plurality of subscription identifiers separate from any subscription record, wherein: when the transient subscription record generator that creates a transient subscription record based on the initial request message, the subscription record retriever adds the at least one subscription identifier to the unknown cache, and the subscription record retriever searches the unknown cache to determine whether a transient subscription record has previously been created for the at least one subscription identifier.

15. A non-transitory machine-readable storage medium encoded with instructions for execution on a session management node for providing network access, the machine-readable storage medium comprising: instructions for receiving, at the session management node, an initial request message, the initial request message including at least one subscription identifier; instructions for determining that the session management node does not have access to a subscription record associated with the at least one subscription identifier; instructions for generating a transient subscription record based on the initial request message; instructions for establishing a session based on the initial request message and the transient subscription record; and instructions for determining, subsequent to creating the transient subscription record, that the session management node has access to a subscription record associated with the at least one subscription identifier; and instructions for replacing the transient subscription record with the subscription record associated with the at least one subscription identifier.

16. The non-transitory machine-readable storage medium of claim 15, wherein instructions for establishing a session based on the initial request message and the transient subscription record comprises: instructions for identifying at least one Policy Charging and Control, (PCC) rule associated with the transient subscription record; and instructions for establishing the session based on the at least one PCC rule associated with the transient subscription record.

17. The non-transitory machine-readable storage medium of claim 16, wherein the instructions for determining, subsequent to creating the transient subscription record, that the session management node has access to a subscription record associated with the at least one subscription identifier comprise: instructions for receiving a supplemental request message associated with the initial request message; and instructions for retrieving, in response to receiving the supplemental request message, a subscription record associated with the at least one subscription identifier.

18. The non-transitory machine-readable storage medium of claim 16, wherein the instructions for determining, subsequent to creating the transient subscription record, that the session management node has access to a subscription record associated with the at least one subscription identifier comprise: instructions for receiving an event message from another node of the network; instructions for determining that the event message indicates that the session management node now has access to an additional subscription record; and instructions for determining that the at least one subscription identifier is associated with the additional subscription record.

19. The non-transitory machine-readable storage medium of claim 15, further comprising: instructions for receiving a supplemental request message associated with the initial request message; and instructions for modifying the transient subscription record based on the supplemental request message.

* * * * *